Oct. 1, 1929.           B. G. LAMME ET AL           1,729,882
                          CONTROL SYSTEM
               Filed Jan. 25, 1924      4 Sheets-Sheet 1

WITNESSES:
                                    INVENTOR
                              Benjamin G. Lamme and,
                              Lloyd J. Hibbard
                                      BY
                                           ATTORNEY

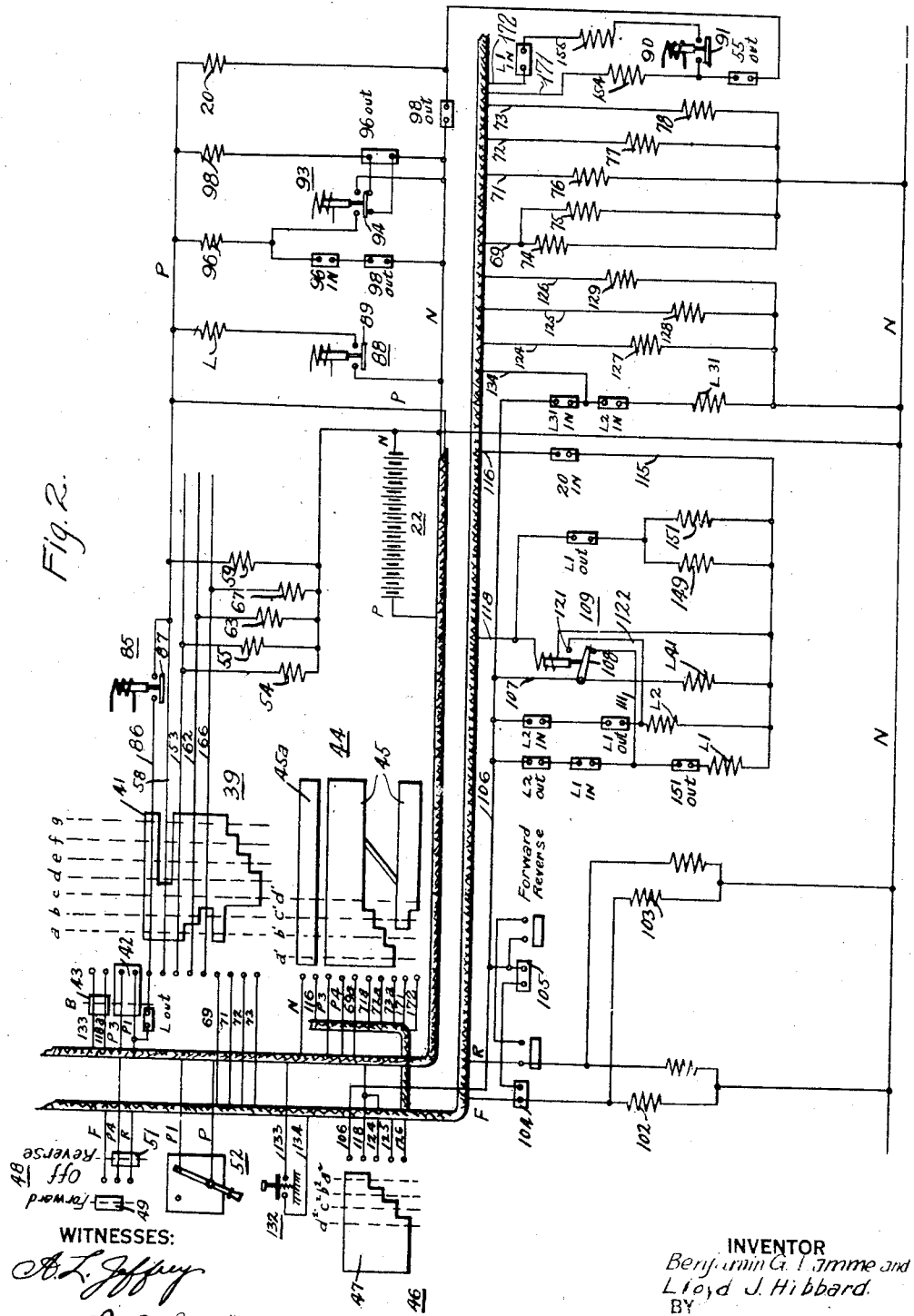

Oct. 1, 1929.  B. G. LAMME ET AL  1,729,882
CONTROL SYSTEM
Filed Jan. 25, 1924  4 Sheets-Sheet 3
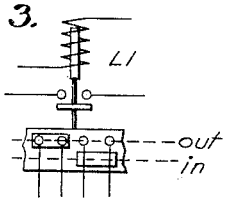
Fig. 3.
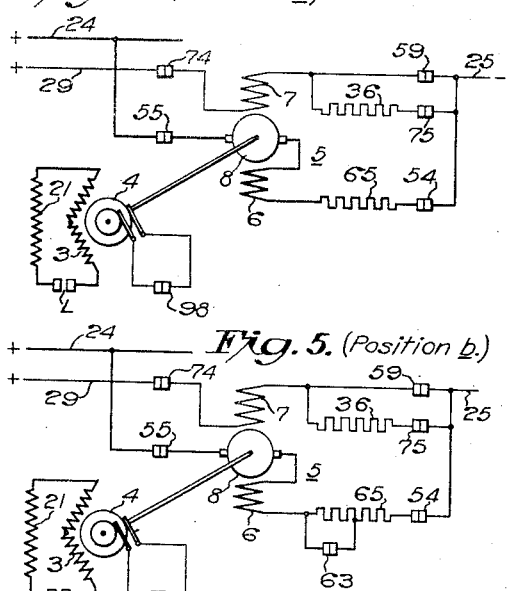
Fig. 4. (Position a.)
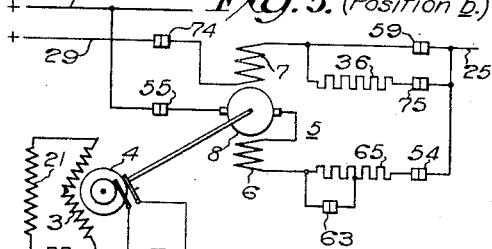
Fig. 5. (Position b.)
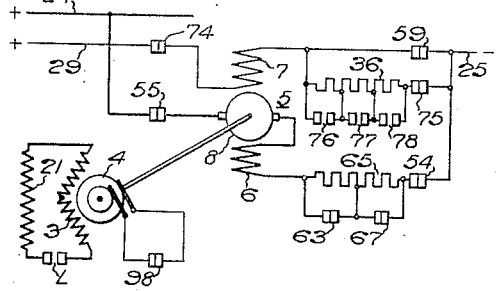
Fig. 6. (Position c.)
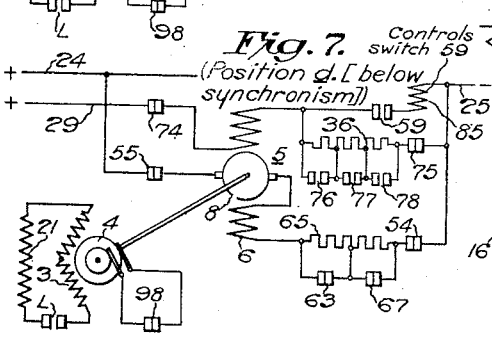
Fig. 7. (Position d. [below synchronism])
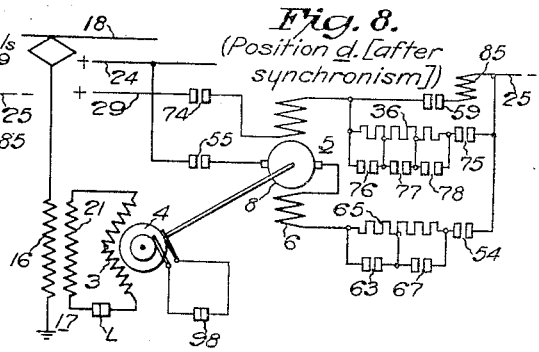
Fig. 8. (Position d. [after synchronism])
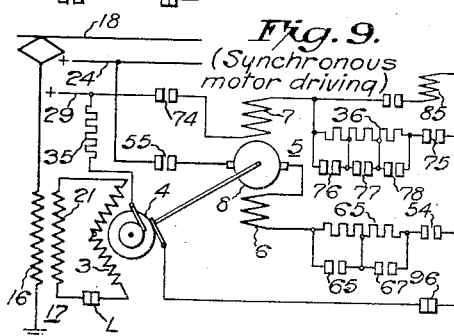
Fig. 9. (Synchronous motor driving)
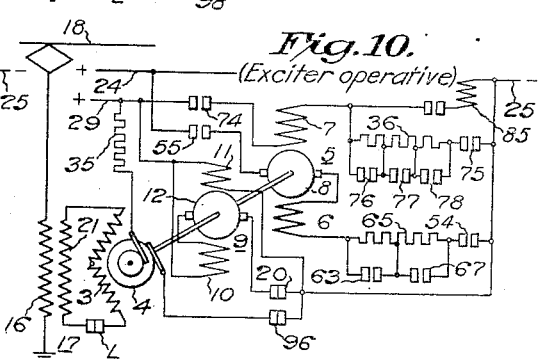
Fig. 10. (Exciter operative)
WITNESSES:
G. S. Neilson
W. R. Coley
INVENTOR
Benjamin G. Lamme and
Lloyd J. Hibbard.
BY
Wesley G. Carr
ATTORNEY Oct. 1, 1929.   B. G. LAMME ET AL   1,729,882
CONTROL SYSTEM
Filed Jan. 25, 1924   4 Sheets-Sheet 4
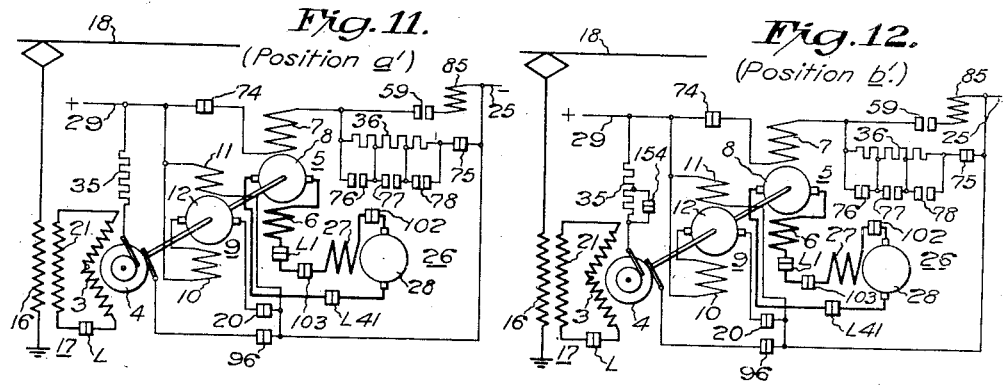
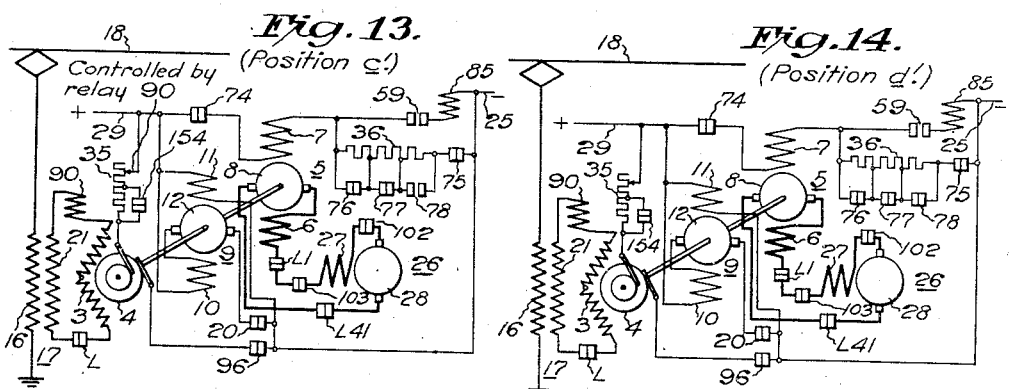
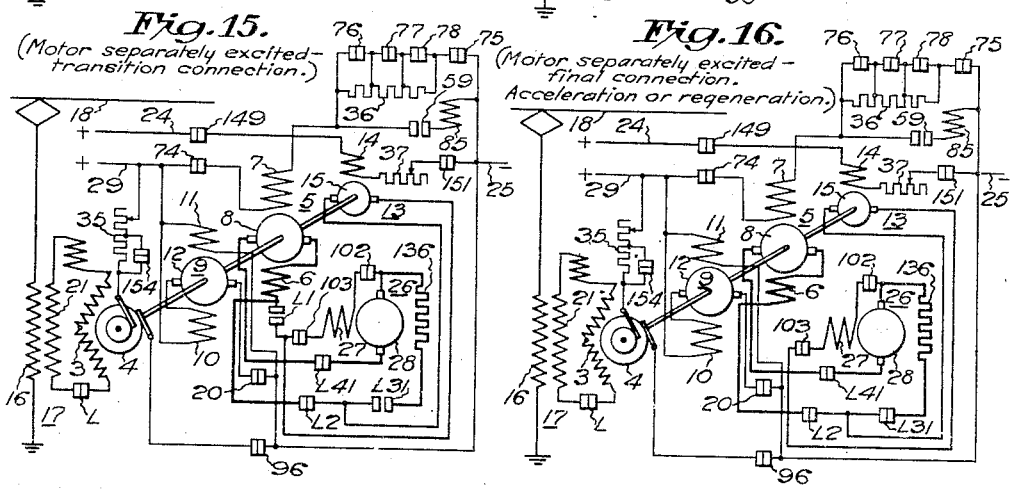
INVENTOR
Benjamin G. Lamme and
Lloyd J. Hibbard.

Patented Oct. 1, 1929

1,729,882

UNITED STATES PATENT OFFICE

BENJAMIN G. LAMME, OF PITTSBURGH, AND LLOYD J. HIBBARD, OF WILKINSBURG, PENNSYLVANIA, ASSIGNORS TO WESTINGHOUSE ELECTRIC & MANUFACTURING COMPANY, A CORPORATION OF PENNSYLVANIA

CONTROL SYSTEM

Application filed January 25, 1924. Serial No. 688,398.

Our invention relates to systems of control, and it has special relation to systems of control adapted for heavy-duty locomotives.

An object of our invention is to provide a system of the above-mentioned character in which a motor-generator set, mounted in a locomotive and comprising a synchronous motor driving a direct-current generator, is adapted to supply current to one or more direct-current traction motors.

Another object of our invention is to provide a system of the above-mentioned character in which the traction motor automatically starts to regenerate or cause power to be returned to the line when the speed of the locomotive exceeds a predetermined value.

Another object of our invention is to provide a system of control of the above-mentioned character, including an auxiliary governing system for reliably effecting proper sequential operation of a plurality of switching devices for governing the motoring and regenerating operation of the traction motors.

These and other objects will become apparent from the following detailed description, taken in conjunction with the accompanying drawing, in which Figure 1 is a diagrammatic view of the main circuit connections and apparatus employed in a control system organized in accordance with our invention;

Fig. 2 is a diagrammatic view of an auxiliary control system for governing the operation of the apparatus shown in Fig. 1;

Fig. 3 is a diagrammatic detail view of one of the switches shown in Fig. 1, and Figs. 4 to 16, inclusive, are simplified diagrammatic views showing successive circuit connections employed in our system.

Referring to Fig. 1 of the drawing, the apparatus here shown comprises a motor-generator set 1, which embodies a single-phase synchronous motor 2, having a stator armature winding 3 and a rotor field winding 4, and a direct-current generator 5, having a series field winding 6, a separately excited field winding 7, and an armature 8; a main exciter 9, having a series field winding 10, a separately excited field winding 11 and an armature 12, and a regenerative exciter 13 having a separately excited field winding 14 and an armature 15. The rotor 4 of the synchronous motor 2 is mounted on the same shaft with the armatures 8, 12 and 15 of the direct-current machines 5, 9 and 13, respectively.

A primary winding 16 of a main or supply transformer 17, is connected to the high voltage trolley 18 through a pantograph or other suitable current-collecting device 19. The secondary or low-voltage winding 21 of the main transformer 17, may be connected to the terminals of the single-phase stator winding 3 of the synchronous motor 2, through a line switch L and the actuating coil of a current relay or limit switch 90. A battery 22 may be connected through a switch 23 across a plurality of secondary or direct-current supply conductors 24 and 25.

A direct-current traction motor 26 having a series-type field winding 27 and an armature 28, is adapted to be connected to the armature terminals of the low-voltage direct-current generator 5. A conductor 29 is connected to the positive terminal 31 of the battery 22, through supply conductors 24 and 34. Therefore the conductor 29 together with supply conductor 25, comprises an auxiliary bus line circuit for a purpose to be hereinafter set forth.

The rotor field winding 4 of the synchronous motor 2 and the shunt field windings 10 and 11 of the generator 5 and the field winding 7 of main exciter 9, are connected across the bus-line conductors 25 and 29. A resistor 35 is connected in series relation with the rotor field winding 4 of the synchronous motor 2, for a purpose to be hereinafter described. A sectionalized resistor 36 having a plurality of switches 76, 77 and 78 for short-circuiting the respective sections thereof, is connected in series relation with the shunt field winding 7 of the generator 5. The terminals of the armature 12 of the main exciter 9, are connected to the respective supply conductors 24 and 25. The separately excited field winding 14 of the regenerative exciter 13 is also connected across the supply conductors 24 and 25. A sectionalized resistor 37, having a plurality of short-circuiting switches 127, 128 and 129 for its respective sections, is connected in series relation with the separately excited field winding 14 of the regenerative exciter 13.

A plurality of synchronous relays 88 and 93 have their actuating coils connected across the terminals of the armature 12 of the main exciter 9, for a purpose to be hereinafter described.

Referring to Fig. 2 of the drawing, the auxiliary governing system shown comprises the actuating coils of the various switches that are shown in Fig. 1, together with a plurality of electrical interlocks of the familiar type that is illustrated in Fig. 3, in connection with the switch L1, and primary controlling apparatus including the battery 22; a "balance and starting" drum 39, having a plurality of contact segments 41, 42 and 43; a "speed" drum 44, having a contact segment 45; a "field change-over" drum 46, having a contact segment 47, and a reverse drum 48, having contact segments 49 and 51.

The operation of the control system may be set forth as follows:

Since the single-phase synchronous driving motor of the main motor-generator set is not self-starting, the set is preferably started and partially accelerated from a source of direct current, namely, the battery 22. For this purpose, a control switch 52 is actuated to the illustrated closed position and the starting drum 39 is actuated to position $a$.

A circuit is then established from the positive terminal of the battery 22, through positive conductor P, control switch 52, conductor P1, interlock L-out, certain control fingers engaging contact segment 41 of the starting drum 39, conductor operating coil of switch 59 to conductor N. The switch 59 is thus actuated to its closed position to constitute a short-circuit for the resistor 36, for a purpose to be hereinafter set forth.

Another circuit is completed, at the same time, from contact segment 41 of the starting drum 39 through conductor 69, operating coils of switches 74 and 75, and negative conductor N to the negative terminal of the battery 22. The switches 74 and 75 are thus closed and the separately excited field winding 7 of the generator 5 is connected through switches 74 and 59 across the bus-line conductors 29 and 25. Full operating voltage is thus impressed upon the separately excited field winding 7 of the generator 5.

Another circuit is established from contact segment 41 of the starting drum 39, through conductor 53 and actuating coils of switches 54 and 55, to conductor N. Switches 54 and 55 are thus actuated to their closed positions and armature 8 and series field winding 6 of the generator 5 are thus connected through resistor 65 across the battery 22. The generator 5 running as a motor will then start to accelerate. See Fig. 4.

The starting drum 39 is then actuated to position $b$. A circuit is then completed from contact segment 41 of the starting drum 39, through conductor 62 and actuating coil of switch 63 to conductor N. Switch 63 is then actuated to its closed position to short-circuit a portion of resistor 65, which is connected in series relation with the armature of the generator 5. See Fig. 5.

When the starting drum 39 is actuated to position $c$, a circuit is established from contact segment 41 through conductor 66 and actuating coil of switch 67 to conductor N. Switch 67 is thus actuated to a closed position to short-circuit the remaining portion of resistor 65. The armature 8 and the series field winding 6 of the generator 5 are thus connected directly across the battery 22, and the generator 5, acting as a motor, will be still further accelerated.

A further auxiliary circuit is established in position $c$, since a plurality of circuits are simultaneously established from contact segment 41 through conductors 71, 72 and 73 and operating coils of the switches 76, 77 and 78, to conductor N. The switches 76, 77 and 78 are thus actuated to their open positions to remove a short-circuiting path for the resistor 36. However, no change in machine operation occurs since the initial short-circuit of resistor 36 by switch 59 is not yet removed. See Fig. 6.

The starting drum 39 may then be actuated to position $d$, whereby the circuit from contact segment 41 through the actuating coil of switch 59 is broken. See Fig. 7. This actuating coil, however, is energized intermittently by means of a fluttering relay 5 of a well-known type. If the starting drum 39 is held in position $d$, the operating coil of the fluttering relay 85, which coil is connected in series relation with the armature circuit of the generator 5, will actuate the bridging member 87 of the relay when excessive current flows through the armature circuit of the generator, while accelerating as a motor, to complete a circuit from conductor P1 through conductor 86, and actuating coil of switch 59 to conductor N.

Switch 59 is thus actuated to its closed position to short-circuit the resistor 36, thus allowing full voltage to be impressed upon the shunt field winding 7 of the generator 8. As the armature current of generator 5 decreases, the bridging member 87 of the fluttering relay 85 will assume its lower or open position, thus deenergizing the actuating coil of the switch 59 to cause the switch to open. Resistor 36 is thus re-inserted in the generator field circuit, and the generator will continue to accelerate as a motor. The fluttering relay 85 will continue to operate in the above manner until the motor-generator set, driven by the generator 5, running as a motor, is accelerated to approximately 60% of the synchronous speed of the motor 2. See Fig. 8. If desired, the switches 76, 77 and 78 may be closed successively, and the corresponding portions of the resistor 36 may be excluded from the field circuit, by manually actuating the starting drum 39 through positions e, f and g.

When the motor-generator set 1 reaches the above-mentioned speed, the actuating coil of the synchronous relay 88, which coil is connected across the armature terminals of the main exciter 9, actuates the bridging member 89 of the relay 88 to its closed position. A circuit is then established from conductor P through actuating coil of the line switch L and bridging member 89 of the cynchronous relay 88 to conductor N. The line switch L is then actuated to its closed position, whereby the stator winding 3 of the synchronous motor 2 is connected across the secondary winding 21 of the main transformer 17.

When the line switch L assumes its closed position, the previously-mentioned interlock L-out operates to de-energize the contact segment 41 of the starting drum 39, and the drum may be returned manually to its off position. The operating coils of the switches 54, 55, 59, 63, 67, 74 and 75 are de-energized and the switches are thus opened. The armature circuit of the generator 5 is thus disconnected from the direct-current supply conductors 24 and 25. The synchronous motor 2 now acts as an induction motor to drive and further accelerate the motor-generator set. See Fig. 8.

When the speed of the synchronous motor 2, running as an induction motor, reaches approximately synchronism, the actuating coil of the synchronizing relay 93 actuates the bridging member 94 to its closed position. A circuit is then established from conductor P through actuating coil of switch 96 and bridging member 94 of the synchronous relay 93 to conductor N. The switch 96 is thus actuated to its closed position to connect the field winding 4 of the synchronous motor 2 across the bus-line conductors 25 and 29. See Fig. 9.

At the same time, a previously existing circuit from conductor P, through actuating coil of the switch 98 and interlock 96-out, to conductor N, is interrupted. Switch 98, which was in the closed position during the acceleration of the motor-generator set, thus short-circuiting the field winding 4 of the synchronous motor 2 during the starting of the motor-generator set 1, is thus opened. The interlocks on switches 96 and 98 are so constructed that a closed circuit transition is effected when switch 96 is actuated to its closed position. In other words, the circuit through switch 98 is not interrupted until switch 96 is in its closed position. During the transition period, a limited short circuit occurs through the resistor 35 across the bus-line conductors 25 and 29. A holding circuit for the actuating coil of switch 96 comprises interlocks 96-in and 98-out. which bridge relay 93.

When the switch 98 is opened as described above, a circuit is established from conductor P through operating coil of the switch 20 and interlock 98-out to conductor N. The switch 20 is thus actuated to its closed position to connect armature 12 of the main exciter 9 across the conductors 24 and 25, which comprise the main-battery or direct-current supply conductors.

After the above operations have taken place, the synchronous motor generator set 2 will "pull into step" and the motor will be driven at synchronous speed. If it is desired to energize the direct-current traction motor 26 to accelerate the train, the reverse drum 48 is actuated to the forward position, for example, and the speed drum 44 is actuated to position $a'$. See Fig. 10. A circuit is then established from conductor P through control switch 52, conductor P1, contact segment 42 of the balance and starting drum 39, conductor P3, contact segment 45 of the speed drum 44, conductor P4, contact segment 49 of the reverse drum 48, conductor F and operating coils of the reversing switches 102 and 103 to conductor N.

The switches 102 and 103 are thus actuated to their closed position to connect the field winding 27 of the traction motor 26 in series relation with the armature circuit. At the same time, a circuit is established from conductor F through interlocks 104 and 105, conductors 106 and 107, bridging member 108 of a relay 109, conductor 111, interlock 151-out, actuating coil of switch L1, conductor 115, interlock 20-in, conductor 116 and contact segment 45a of the speed drum 44 to conductor N. A holding circuit for the actuating coil of switch L1 comprises the interlocks L2-out and L1-in.

Another circuit is established at this time from conductors 106 and 107 through actuating coil of the switch L41, conductor 115 and through a circuit, as previously traced, to conductor N. Switches L1 and L41 are thus closed to connect the traction motor 26 across the armature circuit of the generator 5.

A circuit is also established from contact segment 45 of the speed drum 44, through conductors 69a and 69, and operating coils of the switches 74 and 75, to conductor N. Switches 74 and 75 are thus actuated to their closed positions, whereby the separately excited field winding 7 of the generator 5 is again connected across the bus-line conductors 25 and 29 through the resistor 36.

The traction motor 26 will now run as a series excited motor. See Fig. 11. To further accelerate the motor 26, the speed drum 44 may be successively actuated to positions $b'$, $c'$ and $d'$. Operating coils of the switches 76, 77 and 78, respectively, were energized from the contact segment 45 of the speed drum 44 in position $a'$ thereof, through conductors 71a, 72a and 73a, respectively, as previously described in connection with the acceleration of the motor-generator set 1. In positions $b'$, $c'$ and $d'$, these conductors are successively de-energized, and switches 76, 77 and 78 are thus successively actuated to their closed positions, whereby the corresponding portions of the resistor 36, which is connected in series relation with the shunt field winding 7 of the generator 5, are successively short-circuited. The excitation of the generator field winding 7 is thus increased and the voltage impressed upon the traction motor 26 is increased accordingly. The traction motor 26 is thus accelerated to a speed corresponding to approximately 17 miles an hour. See Figs. 12, 13 and 14.

If further acceleration of the motor 26 is desired, the field-winding connections are changed from series to separately excited. In making the above change, a closed circuit transition is effected as follows. When the speed drum 44 occupies one of its operative positions, the field change-over drum 46 is actuated to position $a^2$. A circuit is then established from conductor 106, which is energized through a circuit previously traced, through contact segment 47 of the field change-over drum 46, conductor 118, operating coil of the switch 109, conductor 115, interlock 20-in, conductor 116 and contact segment 45a of the speed drum 44 to conductor N. The operating coil of the switch 109 is thus energized, whereby the bridging member 108 of the switch is actuated to engage a stationary contact member 121.

A circuit is then established from conductors 106 and 107 through bridging member 108 of the switch 109, contact member 121, conductor 122, operating coil of the switch L2, conductor 115 and, through a circuit previously traced, to conductor N. Switch L2 is thus actuated to its closed position. When the switch L2 is closed, the circuit through operating coil of the switch L1 is interrupted by reason of the interlock L2-out assuming its "in" position. When the circuit through the operating coil is interrupted, and the switch L1 assumes its open position, interlock L1-in assumes its "out" position. A holding circuit is then established from conductor 106 through interlocks L2-in and L1-out, operating coil of the switch L2, conductor 115, and through a circuit previously traced to conductor N. The interlocked switches L1 and L2 are so constructed that switch L1 will be opened a fraction of a second after switch L2 is closed, to thereby prevent opening of the traction motor circuit. The closure of switch L2 temporarily connects the armature 15 of the regenerative exciter 13 in series relation with the traction motor 26.

The series field connections of the traction motor are not affected by this new connection. The field winding 14 of the regenerative exciter 13 is also energized as soon as switch L1 opens, by means of a circuit extending from conductor 118 through interlock L1-out and the parallel-connected actuating coils of the switches 149 and 151. The field winding 14 is thus connected through resistor 37 across supply conductors 24 and 25. See Fig. 15.

To effect the change from the series-excited connection of the motor 26 to the separately excited connection, the field change-over drum 46 is manipulated to a selected position that will regulate the counter-electromotive force across the regenerative exciter armature 15 to a value that is equal and opposite to the RI drop across the traction motor field winding 27. This result is accomplished by successively energizing through conductors 124, 125 and 126, respectively, the operating coils of the switches 127, 128 and 129, which are adapted to short-circuit certain portions of the resistor 37 in a well-known manner to strengthen the shunt field excitation of the regenerative exciter 13. When the balancing voltage is reached, it will be indicated by a zero reading on the balancing volt meter 131, which is connected across the switch L31. When the zero reading is observed, the field change-over push button or switch 132 is manually closed and the balancing and starting drum 39 is actuated to its B or balancing position. A circuit is then established from the contact segment 47 of the field change-over drum 46, through conductor 118a, contact segment 43 of the balancing and starting drum 39, conductor 133, push-button switch 132, conductor 134, interlock L2-in and actuating coil of the switch L31 to conductor N. Switch L31 is thus actuated to its closed position, whereby the series-excited connection of the traction motor 26 is changed to a separately-excited connection. See Fig. 16.

When the above change has been effected, a stabilizing resistor 136 is connected in series relation with the armature 28 of the motor 26, across the armature terminals of the generator 5.

Moreover, the field winding 27 is connected in series relation with the armature 15 of the regenerative exciter 13 across the stabilizing resistor 136 in such a manner that the stabilizing resistor carries the difference between the field and armature currents of the motor 26 during the motoring period, but carries the sum of the same two currents during the regenerating period. An increase in motoring current, therefore, will simultaneously increase the voltage across the field winding 27 or an increase in regenerative current will simultaneously decrease the voltage across the field winding 27.

This connection provides inherent stability throughout the separately-excited period by inherently varying the traction motor field strength, and thereby varying the counter-electromotive force across the motor armature to properly limit gradual or sudden changes in armature current during either acceleration or regeneration. The above-mentioned use of a stabilizing resistor is more fully described and claimed in Patent No. 1,298,943, to R. E. Hellmund and R. E. Ferris, issued on April 1, 1919, and assigned to the Westinghouse Electric & Manufacturing Company.

When switch L31 is actuated to its closed position a holding circuit is established from conductor 106 through interlock L31-in, interlock L2-in and operating coil of switch L31 to conductor N. The balance and starting drum 39 may then be returned to the "off" position.

If a higher running speed of the traction motor is desired, portions of the resistor 37 may be short-circuited successively by manipulation of field change-over drum 46 in a well-known manner, thus further weakening the shunt field excitation of the regenerative exciter 13.

If it is desired to start the train from rest under separately-excited conditions of the traction motor 26, the speed drum 44 may be placed in position $a'$, the traction motor field-winding connections may be then changed in the manner indicated above, and the train may be accelerated by actuating the speed drum 44 through its successive positions, until the last operating notch is reached. The train may be still further accelerated by actuating the field change-over drum through its successive positions, as described above.

If the train passes over the brow of a hill and starts to descend a grade while the traction motor is separately excited, when a certain speed is exceeded the traction motor voltage will overbalance the generator voltage and will cause the armature current to reverse. The traction motor 26 will then act as a generator and will drive the generator 5 as a motor. The generator 5, running as a motor, will, in turn, drive the synchronous motor 2, as a generator, whereby power will be returned to the line through the main transformer 17 and the current-collector 19. Regenerative operation may also be employed if desired to retard the train when operating on level ground.

The train may be held to any desired speed during either regeneration or the latter portion of the accelerating period by proper manipulation of the field change-over drum 46. The closed transition by which the change is effected from the series connection of the traction motor to the separately excited connection, allows the traction motor to work at full load without interrupting or appreciably changing the value of motoring tractive effort either during the change-over period or after the separately excited connection has been completed.

For the purpose of maintaining a relatively high power-factor of the supply line to the locomotive, the inherent regulating effect of the synchronous motor 2 is employed as follows:

During a given initial portion of the operation of the traction motor 26, a suitable excitation of the synchronous motor field winding 4 is maintained by reason of the entire resistor 35 being inserted in circuit with the field winding. In other words, switches 154 and 155 remain open in the "off" position and in position $a'$ of the speed drum 44.

In position $b'$ of the speed drum, a suitably increased excitation of the synchronous motor is provided by the closure of switch 154 to short-circuit a portion of resistor 35. This switch is closed by a circuit extending from contact segment 45 of the speed drum 44 through conductor 171, actuating coil of switch 154, interlocks 55-out and 98-out to negative conductor N. See Fig. 12.

The excitation of the synchronous motor is further increased automatically whenever the load thereon reaches a predetermined relatively heavy value such as 125% of rated full load. This result is accomplished by the completion of a circuit in positions $c'$ and $d'$ of the speed drum from contact segment 45 thereof through conductor 172, interlock L1-in, actuating coil of switch 155, movable contact member 91 of current relay 90 in its upper or high-current position and thence through interlock 55-out to negative conductor N, as previously traced, thus causing the closure of switch 155. See Fig. 14.

If the speed of the motor-generator set falls below a given value, such as 92% of the synchronous speed of the motor, after a line voltage failure or disconnection of the locomotive from the supply circuit, the synchronous relay 93 will drop out, thereby causing the opening of switch 96 and the closure of switch 98, by means of the bridging member 94 of the relay, as illustrated in Fig. 2. The field winding 2 is thus automatically short-circuited and the synchronous motor is in readiness for the next operation upon the resumption of line voltage.

If the speed of the motor-generator set continues to decrease to a point below approximately 50% of the synchronous speed, then synchronous relay 88 drops out to effect opening of the line switch L for the armature circuit of the synchronous motor.

In this way the synchronous relay 93 causes the short-circuiting of the synchronous motor field winding 2, while the synchronous motor armature circuit remains closed, if the speed of the motor generator set decreases a certain amount; and this set of connections is maintained as long as the speed is sufficiently high to permit the re-acceleration of the motor-generator set by alternating-current power. However, if the speed drops below this limit, then the synchronous relay 88 causes the opening of the synchronous motor armature circuit, whereby re-acceleration or a new start of the motor may be accomplished only by the use of the direct-current generator 5 running as a motor, as previously described.

It should be noted that the difficulties and dangers incident to "slipping" of the vehicle wheels are entirely precluded by our invention, as a very low voltage is impressed and maintained across each traction motor while the maximum starting tractive effort is being exerted. In the present case, the traction motor or motors is or are connected directly across the main generator terminals, with no resistor or other armature interposed: that is, the traction motors, if more than one is employed, are connected in parallel relation. Consequently, troubles that have arisen in other types of systems, wherein series-related armatures or an armature and a resistor were connected across the supply circuit, cannot occur in our present system. In such other systems, a diminution of load and resultant "slipping" of wheels corresponding to a given motor was accompanied by a rapid increase of voltage taken by the "slipping" motor. However, in the present case, no such increased voltage can be applied to a motor, as the main generator is directly connected thereto.

Thus by employing our invention, all such "slippage" difficulties, including the action known as "chattering slip", are precluded.

We do not wish to be restricted to the specific circuit connections and arrangement of parts herein set forth, as it is evident that various modifications may be made within the spirit and scope of our invention. We desire, therefore, that only such limitations shall be imposed as are indicated in the appended claims.

We claim as our invention:

1. A system of control comprising a synchronous dynamo-electric machine and a direct-current dynamo-electric machine mechanically connected thereto, and means operative when said machines are decreasing in speed for successively rendering the excitation circuit of said synchronous machine inoperative and opening the main circuit thereof.

2. A system of control comprising a motor-generator set including a synchronous motor and a direct-current generator and means operative during a period of decreasing speed of the motor-generator set for first rendering the excitation circuit of the synchronous motor inoperative until a speed is reached below which it is undesirable to supply accelerating energy to said synchronous motor and for then opening the synchronous motor armature circuit to insure that a re-starting of the motor-generator set may be accomplished only by the use of said direct-current generator as a starting motor.

3. A system of control comprising a motor-generator set including a single-phase synchronous motor and a direct-current generator, and a plurality of relay devices adapted to be energized in accordance with the speed of said motor-generator set for respectively rendering the excitation circuit of the synchronous motor inoperative until a speed is reached corresponding to the point of initial stable accelerating operation of said single-phase synchronous motor and for then opening the synchronous motor armature circuit to insure that a re-starting of the motor-generator set may be accomplished only by the use of said direct-current generator as a starting motor.

4. In a control system for electric vehicles, in combination, a direct current traction motor having armature and field windings, means for connecting the armature and field windings in series relation, means for exciting the field windings, means for controlling the voltage of the exciting means to balance it with the voltage across the field winding, and means for connecting the field winding across the exciting means and interrupting the series connections of the armature and field windings.

5. In a control system for electric vehicles, in combination, a direct current traction motor having armature and field windings, means for connecting the armature and field windings in series relation, means for exciting the field winding, means for controlling the voltage of the exciting means to balance it with the voltage across the field windings, and manually operable means for effecting the connection of the field windings across the exciting means and effecting the interruption of the series connections between the armature and field windings.

6. In a control system for motor vehicles, in combination, a motor provided with field and armature windings, means for connecting said armature and field windings in series-circuit relation, a generator, means for connecting said generator to said motor, means for varying the voltage of said generator to control the speed of said motor, an auxiliary generator, means for connecting the field winding for separate excitation to said auxiliary generator, and means for maintaining the field winding and armature energized while changing from series to separate excitation.

7. In a control system for motor vehicles, in combination, a motor provided with field and armature windings, a source of electric power supply, means for connecting the armature and field windings in series to said power supply, means for varying the voltage of the power supply impressed on said armature and field windings to accelerate the motor, an auxiliary source of power supply, means for connecting the field winding for separate excitation to said auxiliary source of power supply, and means for maintaining said armature and field windings energized while changing the excitation connections.

In testimony whereof, we have hereunto subscribed our names this 17th day of January, 1924.

BENJ. G. LAMME.
LLOYD J. HIBBARD.